US007686689B2

(12) United States Patent
Thomas

(10) Patent No.: US 7,686,689 B2
(45) Date of Patent: Mar. 30, 2010

(54) BASIC WAGERING GAME HAVING A CONTINUOUSLY MODIFIED PAY TABLE

(75) Inventor: Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 1109 days.

(21) Appl. No.: 10/777,004

(22) Filed: Feb. 10, 2004

(65) Prior Publication Data

US 2005/0176494 A1 Aug. 11, 2005

(51) Int. Cl.
*A63F 13/00* (2006.01)

(52) U.S. Cl. ............................ 463/27; 463/20; 463/30; 273/138.1; 273/138.2

(58) Field of Classification Search ..................... 463/1, 463/16, 20–21, 23, 25–27, 29, 30–34, 10–13, 463/17–19; 273/138.1, 138.2, 141 A, 142 B, 273/142 C, 142 J, 148 R; *A63F 13/00*
See application file for complete search history.

(56) References Cited

U.S. PATENT DOCUMENTS 4,099,722 A 7/1978 Rodesch et al.
4,238,127 A 12/1980 Lucero et al.
4,283,709 A 8/1981 Lucero et al.
4,299,388 A 11/1981 Resch et al.
4,448,419 A 5/1984 Telnaes ....................... 273/143
4,624,459 A 11/1986 Kaufman ..................... 273/143
4,679,143 A 7/1987 Hagiwara ................... 364/412
4,695,053 A 9/1987 Vazquez, Jr. et al. ........ 273/143
4,837,728 A * 6/1989 Barrie et al. .................. 463/27
4,856,787 A 8/1989 Itkis ........................... 273/237
4,991,848 A 2/1991 Greenwood et al. ......... 273/143
5,069,453 A 12/1991 Koza .......................... 273/139
5,083,271 A 1/1992 Thacher ...................... 364/411
5,116,055 A * 5/1992 Tracy .......................... 463/27
5,123,649 A * 6/1992 Tiberio ................... 273/143 R
5,205,555 A 4/1993 Hamano ..................... 273/143
5,259,616 A 11/1993 Bergmann .................. 273/138
5,275,400 A 1/1994 Weingardt et al. ............ 273/85

(Continued)

FOREIGN PATENT DOCUMENTS

CA 2334546 7/2001

(Continued)

*Primary Examiner*—Peter DungBa Vo
*Assistant Examiner*—Arthur O. Hall
(74) *Attorney, Agent, or Firm*—Nixon Peabody LLP

(57) ABSTRACT

A method of playing a basic wagering game comprises conducting the basic wagering game at a gaming terminal in response to receiving a wager input. The method includes apportioning the wager input among a plurality of winning outcomes for the basic wagering game, such that the apportioning increases a payout amount associated with each of the winning outcomes. The method includes awarding the payout amount associated with one of the plurality of winning outcomes in response to a randomly selected outcome in the basic wagering game being that one of the plurality of winning outcomes. The method is implemented in a gaming system comprising a plurality of gaming terminals and a controller. The controller is coupled to each of the gaming terminals and receives wager-input signals from the gaming terminals. In response to receiving the wager-input signal, the controller allocates a portion of the wager input among the winning outcomes.

22 Claims, 6 Drawing Sheets

U.S. PATENT DOCUMENTS

| | | | | | |
|---|---|---|---|---|---|
| 5,277,424 | A | | 1/1994 | Wilms | 273/85 |
| 5,280,909 | A | * | 1/1994 | Tracy | 463/27 |
| 5,292,127 | A | | 3/1994 | Kelly et al. | 273/138 |
| 5,401,023 | A | | 3/1995 | Wood | 273/85 |
| 5,494,287 | A | * | 2/1996 | Manz | 273/143 R |
| 5,511,784 | A | | 4/1996 | Furrey et al. | 273/143 |
| 5,564,700 | A | * | 10/1996 | Celona | 463/27 |
| 5,580,309 | A | * | 12/1996 | Piechowiak et al. | 463/16 |
| 5,618,232 | A | | 4/1997 | Martin | 463/29 |
| 5,639,088 | A | | 6/1997 | Schneider et al. | 273/138.2 |
| 5,643,088 | A | | 7/1997 | Vaughn et al. | 463/40 |
| 5,655,961 | A | | 8/1997 | Acres et al. | 463/27 |
| 5,702,304 | A | * | 12/1997 | Acres et al. | 463/29 |
| 5,704,835 | A | | 1/1998 | Dietz, II | 463/20 |
| 5,779,549 | A | | 7/1998 | Walker et al. | 463/42 |
| 5,851,149 | A | * | 12/1998 | Xidos et al. | 463/42 |
| 5,885,158 | A | * | 3/1999 | Torango et al. | 463/27 |
| 6,007,426 | A | * | 12/1999 | Kelly et al. | 463/16 |
| 6,012,982 | A | * | 1/2000 | Piechowiak et al. | 463/16 |
| 6,039,648 | A | * | 3/2000 | Guinn et al. | 463/16 |
| 6,053,813 | A | * | 4/2000 | Mathis | 463/26 |
| 6,068,552 | A | * | 5/2000 | Walker et al. | 463/21 |
| 6,068,553 | A | * | 5/2000 | Parker | 463/27 |
| 6,077,162 | A | * | 6/2000 | Weiss | 463/26 |
| 6,104,815 | A | | 8/2000 | Alcorn et al. | 463/16 |
| 6,110,041 | A | | 8/2000 | Walker et al. | 463/20 |
| 6,146,273 | A | * | 11/2000 | Olsen | 463/27 |
| 6,217,448 | B1 | * | 4/2001 | Olsen | 463/25 |
| 6,293,865 | B1 | * | 9/2001 | Kelly et al. | 463/16 |
| 6,503,146 | B2 | * | 1/2003 | Walker et al. | 463/25 |
| 6,508,709 | B1 | * | 1/2003 | Karmarkar | 463/42 |
| 6,634,946 | B1 | * | 10/2003 | Bridgeman et al. | 463/28 |
| 6,645,068 | B1 | | 11/2003 | Kelly et al. | 463/9 |
| 6,663,487 | B1 | * | 12/2003 | Ladner | 463/13 |
| 6,722,980 | B2 | * | 4/2004 | Stronach | 463/25 |
| 6,802,778 | B1 | * | 10/2004 | Lemay et al. | 463/42 |
| 6,824,465 | B2 | * | 11/2004 | Luciano, Jr. | 463/18 |
| 7,018,293 | B2 | * | 3/2006 | Brown et al. | 463/20 |
| 7,297,059 | B2 | * | 11/2007 | Vancura et al. | 463/27 |
| 7,341,518 | B2 | * | 3/2008 | Muskin | 463/25 |
| 7,465,229 | B2 | * | 12/2008 | Shuster | 463/21 |
| 7,481,430 | B1 | * | 1/2009 | Jackson et al. | 273/138.1 |
| 2001/0004607 | A1 | * | 6/2001 | Olsen | 463/26 |
| 2002/0039923 | A1 | * | 4/2002 | Cannon et al. | 463/42 |
| 2002/0160827 | A1 | * | 10/2002 | Slomiany et al. | 463/16 |
| 2002/0173355 | A1 | * | 11/2002 | Walker et al. | 463/25 |
| 2003/0092484 | A1 | * | 5/2003 | Schneider et al. | 463/25 |
| 2003/0224852 | A1 | * | 12/2003 | Walker et al. | 463/20 |
| 2004/0005919 | A1 | * | 1/2004 | Walker et al. | 463/23 |
| 2005/0085285 | A1 | * | 4/2005 | Muskin | 463/13 |

FOREIGN PATENT DOCUMENTS

| | | | |
|---|---|---|---|
| DE | 39 15 655 | | 11/1990 |
| GB | 1550732 | | 8/1979 |
| GB | 2092796 | A | 8/1982 |
| GB | 2096376 | A | 10/1982 |
| GB | 2 098 779 | | 11/1982 |
| GB | 2097570 | A | 11/1982 |
| GB | 2 131 587 | | 6/1984 |
| WO | WO 98/15928 | | 4/1998 |
| WO | WO 00/41636 | | 7/2000 |
| WO | WO 01/51143 | | 7/2001 |

* cited by examiner

BASIC WAGERING GAME HAVING A CONTINUOUSLY MODIFIED PAY TABLE

FIELD OF THE INVENTION

The present invention relates to gaming terminals and gaming systems and, in particular, to a basic wagering game that has a plurality of winning outcomes that have payout amounts that change as a function of the wager inputs at that specific gaming terminal or at several linked gaming terminals within the gaming system.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by increasing the entertainment value and excitement associated with the game.

One concept that has been successfully employed to enhance the entertainment value of a game is that of a "secondary" or "bonus" game which may be played in conjunction with a "basic" game. The bonus game, which is entered upon the occurrence of a selected event or outcome of the basic game (i.e., a start-bonus outcome), may comprise any type of game, either similar to or completely different from the basic game. Such a bonus game produces a significantly higher level of player excitement than the basic game because it provides a greater expectation of winning than the basic game.

Another concept that has been employed to enhance player entertainment is the use of progressive games. In the gaming industry, a "progressive" game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In the basic games played at existing gaming terminals, the values of the payout amounts for each winning outcome is established and typically remains constant. Unlike the progressive game mentioned above, there is no sense of competition against other players in the basic games that are currently known.

There is a continuing need to develop new features for basic wagering games to satisfy the demands of players and operators. Preferably, such new features will further enhance the level of player excitement. The present invention is directed to satisfying these needs in that it enables players to compete against each other during the basic wagering game.

SUMMARY OF THE INVENTION

The present invention relates to a method of playing a basic wagering game comprising conducting the basic wagering game at a gaming terminal in response to receiving a wager input. The method includes apportioning the wager input among a plurality of winning outcomes for the basic wagering game, such that the apportioning increases a payout amount associated with each of the plurality of winning outcomes. The method includes awarding the payout amount associated with one of the plurality of winning outcomes in response to a randomly selected outcome in the basic wagering game being that one of the plurality of winning outcomes. In doing so, the pay tables for the basic wagering game become active in that they are constantly changing, thereby increasing player excitement.

The present invention can also be thought of as a gaming system comprising a plurality of gaming terminals and a controller. The gaming terminals play a basic wagering game in response to receiving wager inputs from players. Each of the plurality of gaming terminals is capable of achieving a plurality of winning outcomes that have a corresponding payout amount. Each of the gaming terminals includes a display for displaying each of the plurality of winning outcomes and the corresponding payout amount. The controller is coupled to each of the plurality of gaming terminals and receives wager-input signals from the plurality of gaming terminals. In response to receiving the wager-input signal from one of the plurality of gaming terminals, the controller allocates a portion of the wager input among the plurality of winning outcomes. The controller also sends an update-display signal to the plurality of gaming terminals to instruct the plurality of gaming terminals to update the corresponding payout amounts for the plurality of winning outcomes.

The above summary of the present invention is not intended to represent each embodiment or every aspect of the present invention. The detailed description and figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
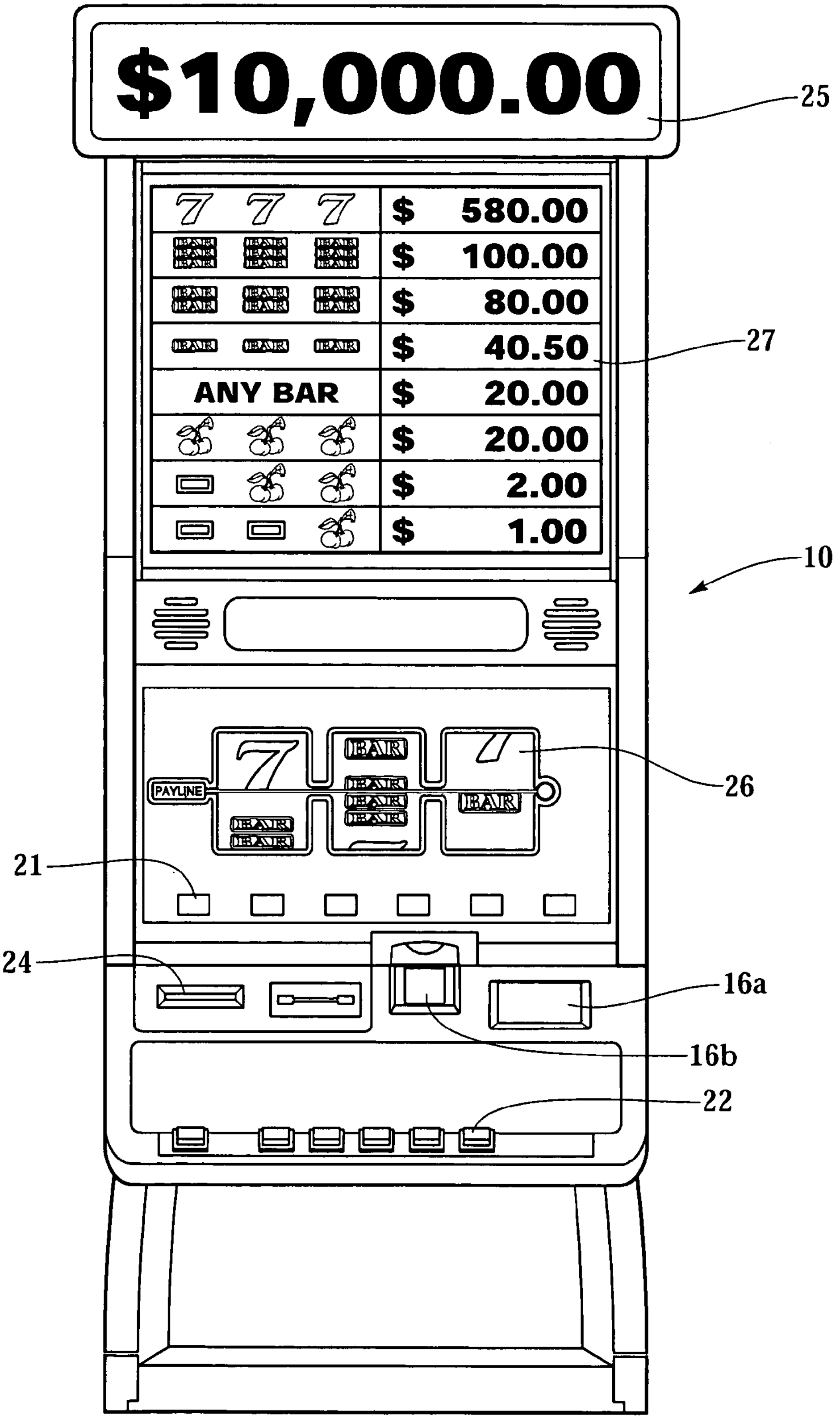
FIG. 1 illustrates a gaming terminal that is useful for operating an enhanced basic wagering game in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play a video casino game, such as blackjack, slots, keno, poker, etc.

As shown, the gaming terminal 10 includes input devices, such as a wager acceptor 16 (shown as a card wager acceptor 16*a* and a cash wager acceptor 16*b*), a touch screen 21, a push-button panel 22, and a player-identification card reader 24. For outputs, the gaming terminal 10 includes a progressive game display 25 for displaying the value of a progressive game, a main display 26 for displaying information about the basic wagering game, and a secondary display 27 that displays an electronic version of a pay table, and also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*b* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The operation of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes a touch screen 21 overlaying the entire monitor (or a portion thereof) to allow players to make game-related selections. Alternatively, the gaming terminal 10 may have a number of mechanical reels to display the game outcome.

The player-identification card reader 24 allows for the identification of a player by reading a card with information indicating his or her true identity. Currently, the identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The gaming terminal 10 may use the secondary display 27 for providing the player with information about his or her account or other player-specific information.

Figure 2:
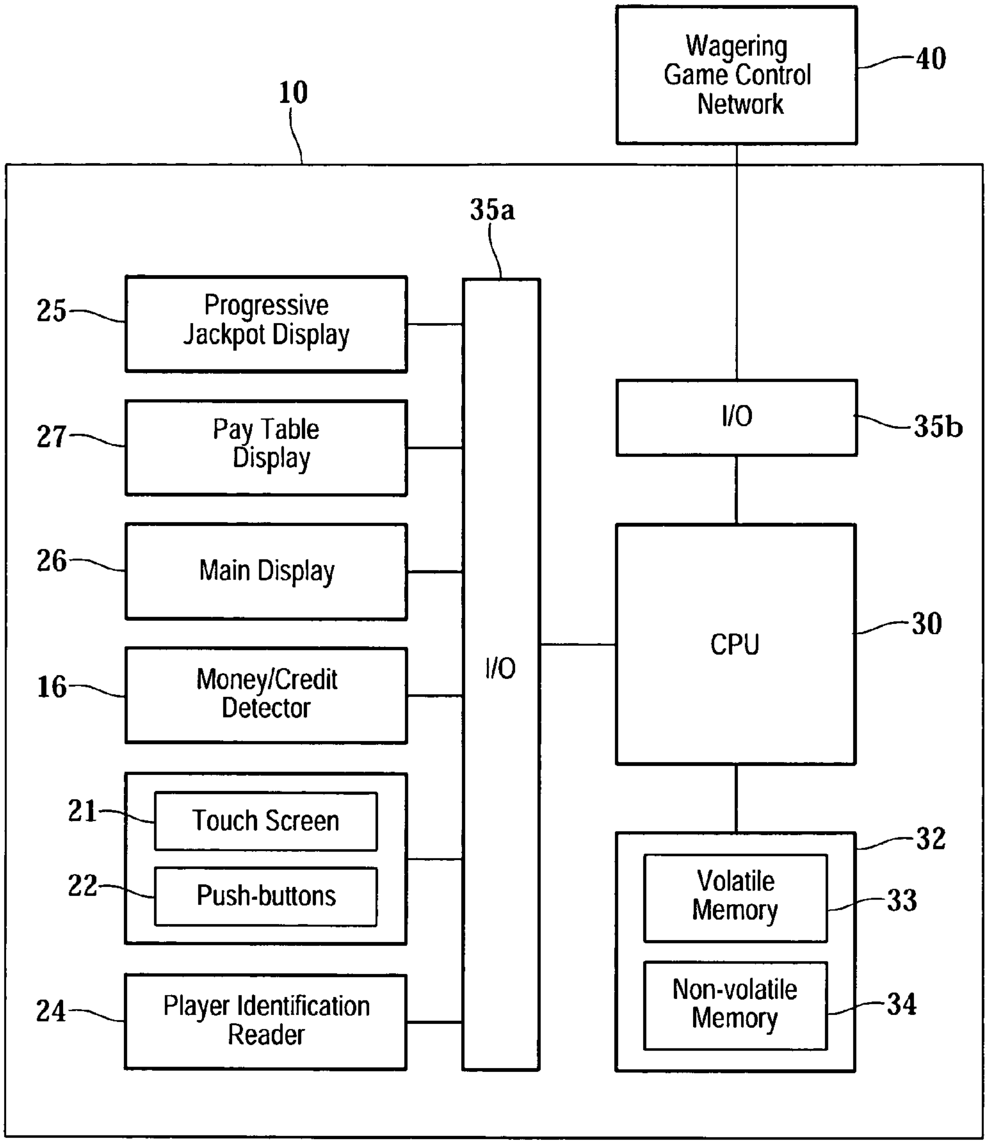
FIG. 2 illustrates a control system that is used in conjunction with the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a system memory 32. The system memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

As will be discussed in more detail below, the gaming terminal 10 is typically operated as part of a wagering game control network 40 having control circuitry and memory devices. The gaming terminal 10 often has multiple serial ports, each port dedicated to providing data to a specific host computer system that performs a specific function (e.g., accounting, player-tracking, or a progressive game control system, etc). To set up a typical serial communication hardware link to the host system, the typical RS-232 point-to-point communication protocol that is often present in the gaming terminal 10 is converted to an RS-485 (or RS-485-type) master-slave protocol so as to take advantage of some of the advantages of the RS-485 capability (e.g., multi-drop capability that allows many gaming terminals 10 to communicate with the game control network 40). To perform this function, a custom interface board may be used by the gaming terminal 10 for each communication port in the gaming terminal 10. It should be noted that the gaming terminal 10 can initially be designed to be configured for a typical RS-485 protocol, instead of the typical RS-232 protocol. Further, the gaming terminal 10 may simply be designed for an Ethernet connection.

Figure 3A:
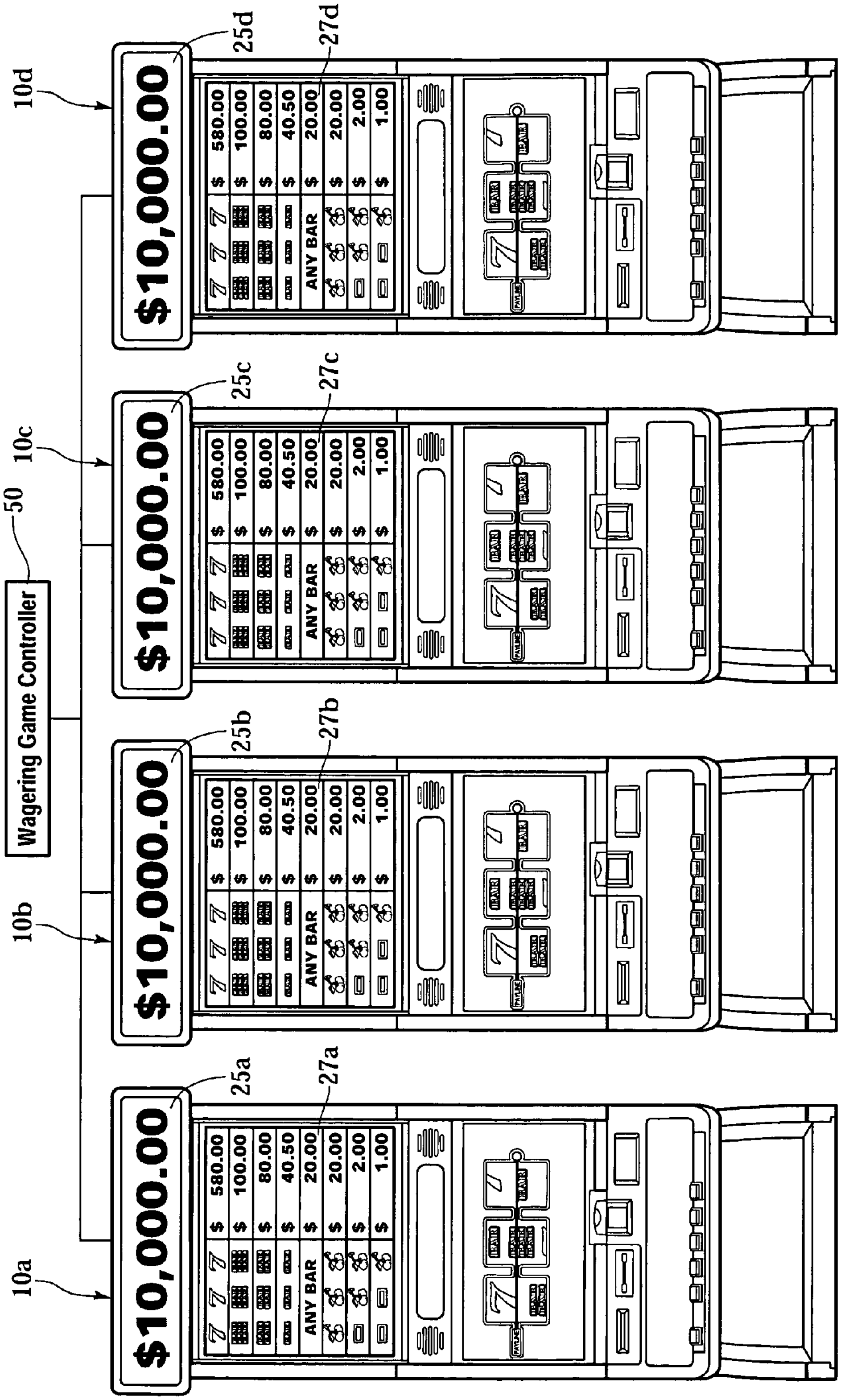
FIGS. 3A and 3B illustrate a group of gaming terminals that are linked to allow players to compete for winning outcomes that are achieved in the basic wagering game in accordance with the present invention.
Figure 3B:
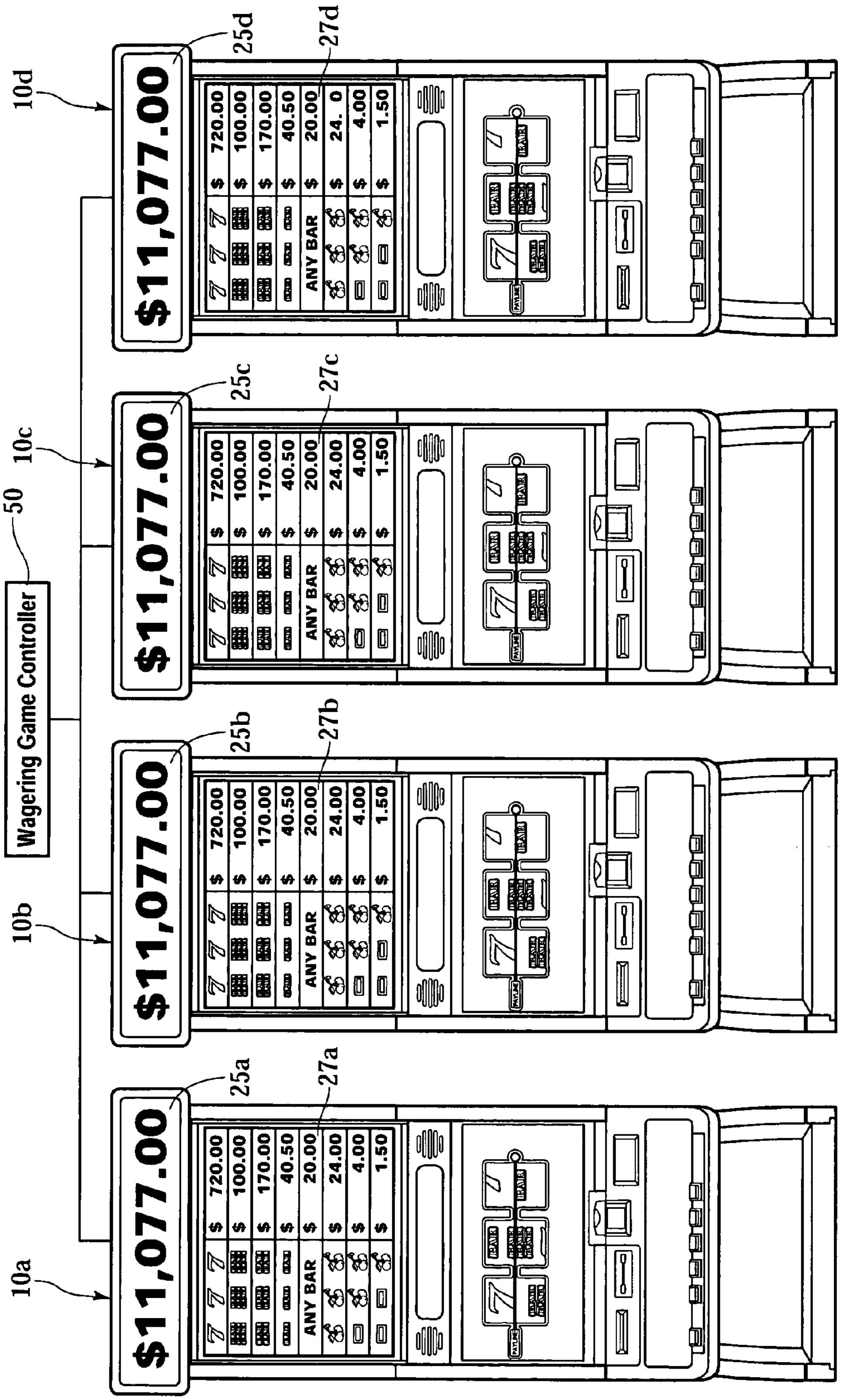

FIGS. 3A and 3B show a bank of gaming terminals 10*a*-10*d* that are interconnected and linked to a wagering game controller 50. The wagering game controller 50 can be linked to a bank (e.g., four or five) of gaming terminals 10*a*-10*d*, a large number of gaming terminals 10 within a casino, or gaming terminals 10 located at several casinos (see FIG. 5 below). Each of the gaming terminals 10*a*-10*d* are competing for a progressive game jackpot as shown in the progressive game displays 25*a*-25*d*. The progressive game may be linked to other gaming terminals so that other players at other gaming terminals may be competing for the same progressive game jackpot. Additionally, and relevant to the present invention, the gaming terminals 10a-10d are competing for eight different basic game winning outcomes shown in the pay table on the secondary displays 27a-27d.

FIG. 3A illustrates the gaming terminals 10a-10d at their initial state. The base value for the progressive game is $10,000 as shown in the progressive game displays 25a-25d. The winning outcomes of the basic game (i.e., the pay table) are shown at their base values in the secondary displays 27a-27d. Typically, the higher payout amounts correspond to winning outcomes (e.g., three 7's) that occur less frequently. Hence, FIG. 3A shows the minimum winning amounts for the various winning outcomes that can be achieved in the basic game.

As players play the basic wagering game at the gaming terminals 10a-10d, the wagering game controller 50 receives input-wager signals from the gaming terminals 10a-10d and apportions the wager inputs "among" the eight winning outcomes of the basic game, thereby increasing the payout amount for the eight winning outcomes. As used herein, the term "among," which is grammatically associated with three or more items, includes the term "between," which is grammatically associated with two items. The percentages of the wager inputs that are allocated among the winning outcomes can be structured in various ways but, typically, the higher-payout winning outcomes (e.g., three 7's) receive a larger percentage of each wager input. A portion of the wager input may also fund the progressive jackpot, which is shown in the progressive displays 25a-25d.

FIG. 3B illustrates the gaming terminals 10a-10d at their operational state in which the values of the winning outcomes have increased due to the apportioning of the wager inputs from the wagering game controller 50. As can be seen by comparing FIGS. 3A and 3B, the pay tables in the secondary display 27a-27d have changed such that several of the winning outcomes have higher payout amounts in FIG. 3B than their initial state of FIG. 3A. Also in FIG. 3B, other winning outcomes have been reset to their initial base amount because these winning outcomes have been achieved at one of the gaming terminals 10a-10d. When such a winning outcome is achieved, the wagering game controller 50 awards the corresponding payout to the player at the winning gaming terminal and sends a reset signal to all of the gaming terminals 10a-10d to reset the payout amount for that specific winning outcome to the base value. After a reset signal is received, any wager inputs at the gaming terminals 10a-10d again add value to the base value, such that it increases until that specific wining outcome is again achieved.

While FIG. 3 has been described in conjunction with a wagering game controller 50 receiving, evaluating, and apportioning the collective wager inputs, the present invention contemplates a single gaming terminal 10a performing these functions as the "master" gaming terminal 10a. Further, the present invention contemplates stand-alone gaming terminals 10 that have changing pay tables such that only the wager inputs at that specific gaming terminal 10 and the winning outcomes achieved at that specific gaming terminal 10 affect its pay table.

Further, the gaming terminals 10 can lack the CPU 30 such that the wager-related processing and the random outcome selections for all the gaming terminals 10a-10d are performed by the wagering game controller 50. In essence, the gaming terminals 10a-10d are simply input stations for receiving inputs from the players and output stations for displaying the pay tables and randomly selected outcomes.

Figure 4:
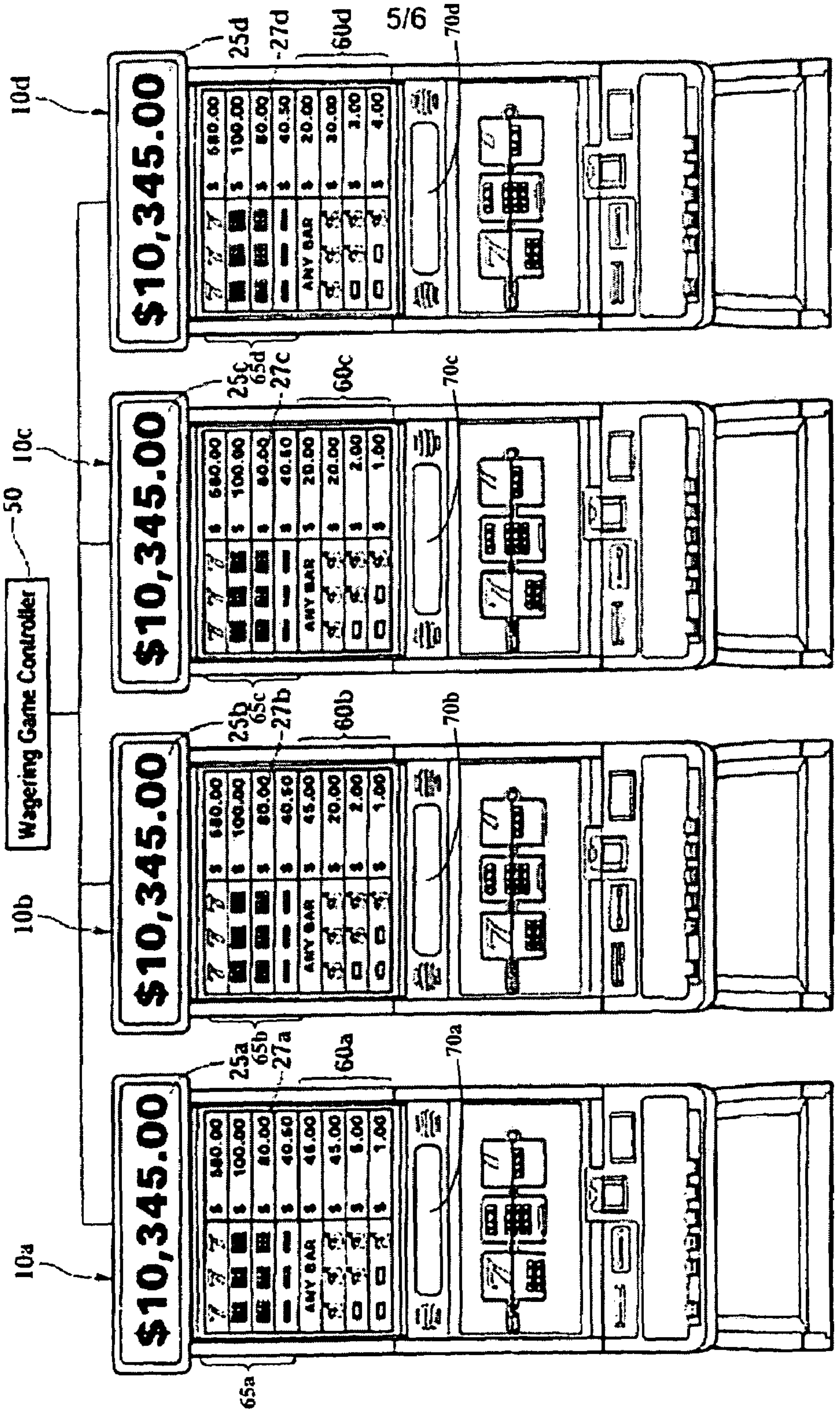
FIG. 4 illustrates an alternative method of operating the basic game whereby players compete for only certain ones of the winning outcomes that are achieved in the basic wagering game.

FIG. 4 shows a variation to the embodiments described relative to FIGS. 3A and 3B. In FIG. 4, the lower four winning outcomes 60a-60c shown on the displays 27a-27d are increased based on portions of wager inputs that are received at that specific gaming terminal 10a-10d (i.e., locally). On the other hand, the upper four winning outcomes 65a-65d are increased based on the wager inputs received from all of the gaming terminals 10a-10d. Accordingly, the upper four winning outcomes 65a-65d on the pay table at each gaming terminal 10a-10d are always identical and increase at the same rate, while the lower four winning outcomes 60a-60d can be different on each gaming terminal 10a-10d. Of course, the number of winning outcomes that are increased based on the wager inputs received from all of the gaming terminals 10a-10d can be more or less than four in number.

As such, each of the gaming terminals 10a-10d in FIG. 4 can be thought of as having a plurality of winning outcomes that are divided into groups. Each group of winning outcomes is allocated a portion of the wager inputs received from various sources. A first group of winning outcomes receives a portion of the wager inputs from a first collection of participating gaming terminals, e.g., all terminals within a wide-area network (See FIG. 5). A second group of winning outcomes receives a portion of the wager inputs from a second collection of participating gaming terminals, e.g., all terminals within the gaming establishment. A third group of winning outcomes receives a portion of the wager inputs from a third collection of participating gaming terminals, e.g., all terminals within a bank of gaming terminals. A fourth group of winning outcomes receives a portion of the wager inputs from only that specific gaming terminal. The groups can have the same number of winning outcomes, or a different number. For example, the first group can consist of one winning outcome, while the fourth group can consist of three winning outcomes. For one participating gaming terminal, the percentages of each wager input that are allocated to the various groups can be the same or can vary. In summary, the sources that increase the payout amounts for certain winning outcomes in the pay table can be different. These different sources may overlap in that gaming terminals in the same gaming establishment may contribute to payout amounts of winning outcomes in the first and second groups mentioned above.

FIG. 4 also illustrates the concept of having a real-time clock 70a-70d on each of the gaming terminals 10a-10d and having a displayed field that indicates the last time that certain winning outcomes have been achieved at the gaming terminals 10a-10d. Specifically, each of the top four winning outcomes 65a-65d includes a time field noting the occurrence of the most recent time at which that specific winning outcome was achieved. In situations where there are many players and many gaming terminals 10a-10d competing for the same winning outcomes, it is possible that two different players can achieve the same winning outcome within seconds of each other. While the increasing payout amounts can be displayed on a real-time basis based on wager inputs that are received at the gaming terminals 10a-10d, it is important that a player does not feel as though he or she was cheated out of a winning outcome. By having a real-time clock 70a-70d that is present on all of the gaming terminals 10a-10d and noting in the pay table the most recent time at which that specific winning outcome was achieved, the player will know when another player has achieved the same winning outcome at a slightly earlier time by noting that time on the real-time clock 70a-70d when he or she achieves that winning outcome. To this end, the time on the real-time clock 70a-70d can flash and retain the exact time when a winning outcome is achieved. Further, a winning outcome on the pay table can be highlighted or flash each time it has been achieved by one of the players as the new time for the most recent win is posted in the first column. While the invention contemplates updating the pay table on a real-time basis, the skilled artisan will note that the pay table can be updated on a periodic basis, such as every 10 or 20 seconds, or after every gaming session resulting from a wager input.

The present invention has the ability to increase player excitement and, thus, increase the rate of wager inputs when winning outcomes that should be achieved more frequently are not achieved for a longer period of time such that they have an usually high payout amount. Players will understand that the probability of achieving that specific winning outcome is relatively high and are more likely to increase their wager input rate with the hope of achieving that specific winning outcome. Of course, when this happens, all the winning outcomes that are achievable at a plurality of gaming terminals 10a-10d (i.e., all the winning outcomes in the pay tables of FIGS. 3A and 3B, and the winning outcomes 65a-65d in the pay tables of FIG. 4) will increase at a corresponding rate.

The basic wagering game having pay tables that are modified based on the wager inputs that are received at one or more of the gaming terminals can be available to anyone who is playing at the gaming terminals or it can be triggered based on the identity of the player. In other words, this type of basic wagering game can be limited to only selected players who qualify based on certain criteria. As one example, players who have a player tracking card for a casino may be the only ones permitted to play the enhanced wagering game. One such network that controls the play of restricted-access wagering games is described in U.S. patent application Ser. No. 60/502,762, filed on Sep. 12, 2003, and entitled "Restricted Access Progressive Game For A Gaming Machine," which is commonly owned and herein incorporated by reference in its entirety.

As described above, the present invention has been focused on a basic wagering game. It should be noted, however, that the enhanced entertainment value associated with real-time modifications to pay table can be implemented in a "bonus" or "secondary" game. As just one example, a player who plays at one of gaming terminals 10 plays a basic wagering game where the pay table is one that does not change based on the wager inputs, as is known on existing prior art gaming terminals. If he or she achieves a certain start-bonus outcome, then the player is permitted to play the same type of game as in the basic wagering game, except the payout amounts in the pay table are changed to reflect a real-time pay table that is affected by wager inputs from other players who are currently playing, or previously played, the bonus game after achieving a similar start-bonus outcome. Hence, when a player achieves a start-bonus outcome, he or she may be able to play this bonus game for a certain number of sessions (e.g., 10 chances). Additional wager inputs can be required during such a bonus game, but are not required. This secondary or bonus game can have payout amounts that are funded by portions of the wager inputs received in the basic wagering game, or wager inputs received during a bonus game, or both. As another example, the bonus-game can simply allow the player a second chance at one or more of the winning outcomes, but with a multiple of the displayed payout amount, or with a higher probabilities of achieving the winning outcomes.

Figure 5:
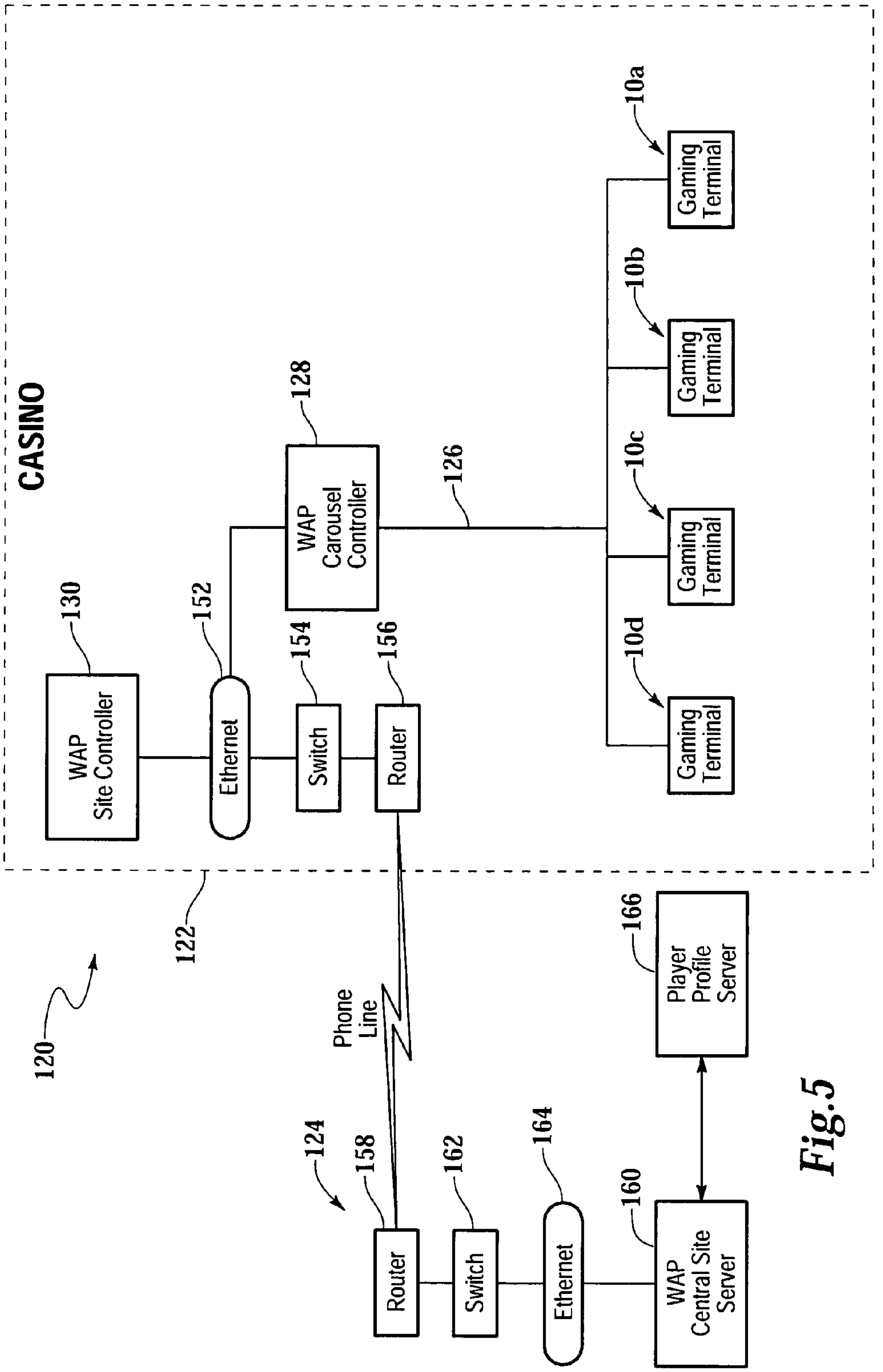
FIG. 5 illustrates one embodiment for a network that is useful for conducting the enhanced basic games in accordance with the present invention.

FIG. 5 illustrates a network 120 that is useful for conducting the basic wagering games that are described above. Because this inventive basic game has elements of a progressive game in that several players are competing for and contributing to the amounts of the various winning outcomes, as used herein, this network 120 will be referred to as the wide-area progressive ("WAP") network 120. The WAP network 120 typically includes components within a casino 122 and components at a remote location 124. Within the casino 122, a plurality of gaming terminals 10a-10d are connected through a multi-drop serial line 126 to a WAP carousel controller 128. The multi-drop serial line 126 may be, for example, an RS-485 serial data line, which is compatible with and linked to the gaming terminals 10a-10d. A WAP site controller 130 is connected to the WAP carousel controller 128 through an Ethernet connection 152.

To link the WAP site controller 130 to the remote location 124, the casino 122 includes one or more switches 154 and routers 156. The router 156 within the casino 122 is connected through a phone line to a corresponding router 158 at the remote location 124. A WAP central site server 160 at the remote location 124 is coupled to the router 158 through a switch 162 and an Ethernet connection 164. The WAP central site server 160 is connected to a player-profile server 166 to allow for the exchange of player data and game data stored within the player-profile server 166.

The player-profile server 166 is needed if the gaming terminals 10a-10d only allow certain individuals to play the inventive basic wagering game and, hence, require some type of player identification. In that situation, a player may identify himself or herself to the WAP network 120 at the gaming terminal 10a through a player-tracking card for the casino, an identification card that is specific to the WAP network, entry of a login name and personal password or pin number, a radio frequency ID device, through biometric inputs, or any other method for identifying the player. The player's information is transmitted along the multi-drop serial line 126 and collected by the WAP carousel controller 128. The WAP carousel controller 128 serves to quickly collect player-identification data from a plurality of gaming terminals 10a-10d and communicate that information to the WAP central site server 160 to ensure the player has access to the novel basic wagering game with real-time pay table changes.

While players are conducting gaming sessions at the gaming terminals 10a-10d, all information concerning the game play is transmitted from the WAP site controller 130 to the WAP central site server 160. The WAP central site server 160 controls the pay tables that are displayed on the gaming terminals 10a-10d. Accordingly, based on wager-input signals received from the WAP site controller 130, updated pay table information is calculated at the WAP central site server 160 and transmitted back to the gaming terminals 10a-10d for displaying to the players. When a player achieves one of the winning outcomes, that information is collected at the WAP site controller 130 and sent to the WAP central site server 160. In this situation, the updated pay table information includes a reset signal to reset the winning outcome to the base value because a player has just achieved that winning outcome. To the extent that the gaming terminals are displaying time-related information (as described in FIG. 4), the WAP central site server 160 can control that information, as well. In sum, the WAP central site server 160 is analogous to the wagering game controller 50 in FIGS. 3-4 when implemented in a gaming network.

The present invention contemplates that the WAP central site server 160 can be linked to various gaming terminals in several casinos. Thus, players can play the inventive basic wagering game at several different casinos and be competing against players in several different casinos.

The WAP network 120 in FIG. 5 is merely one example of many possible networks that can be developed to support the inventive basic wagering game. Many other types of connections between the gaming terminals 10*a*-10*d* and the WAP site controller 130 and between the WAP site controller 130 and the WAP central site server 160 can be utilized. Further, the WAP network 120 can be located entirely within the casino 122 and dedicated to only one casino 122, such that it performs all functions related to the progressive game within the casino 122. In such an embodiment, all information regarding the player and the altering of the pay tables are processed locally and stored locally in databases within the casino 122.

While the present invention has been described with reference to one or more particular embodiments, those skilled in the art will recognize that many changes may be made thereto without departing from the spirit and scope of the present invention. For example, instead of two displays 26 and 27 on the gaming terminal 10 for displaying the basic game outcome and the pay table, one display could display both of these pieces of information. And while the present invention has been described relative to a video slot machine, the skilled artisan will understand how it can be implemented with other types of gaming devices, such as video poker. Each of these embodiments and obvious variations thereof is contemplated as falling within the spirit and scope of the claimed invention, which is set forth in the following claims.

What is claimed is:

1. A gaming system, comprising:

a plurality of gaming terminals that play a basic wagering game in response to receiving wager inputs from players, each of said plurality of gaming terminals configured to achieve a plurality of winning outcomes that each have a corresponding payout amount, said plurality of winning outcomes being determined by various symbol combinations, each of said plurality of gaming terminals including a display that displays a pay table with each of said plurality of winning outcomes and said corresponding payout amount, a majority of said payout amounts each providing a different corresponding progressive award, said progressive awards being displayed in the pay table; and a controller coupled to each of said plurality of gaming terminals and receiving wager-input signals from said plurality of gaming terminals, in response to receiving a wager-input signal from one of said plurality of gaming terminals, said controller allocating portions of said wager input among said progressive awards and sending an update pay-table signal to said plurality of gaming terminals to instruct said plurality of gaming terminals to update said corresponding progressive awards displayed in said pay table, said pay table being continuously displayed as said progressive awards are being updated.

2. The gaming system of claim 1, wherein said update pay-table signal is sent on a real-time basis.

3. The gaming system of claim 1, wherein said update pay-table signal is sent on a periodic basis.

4. The gaming system of claim 1, wherein said plurality of gaming terminals are a bank of terminals within one gaming establishment and said controller is located within said gaming establishment.

5. The gaming system of claim 1, wherein said plurality of gaming terminals are located in one gaming establishment and said controller is located remotely from said gaming establishment.

6. The gaming system of claim 1, wherein said plurality of gaming terminals are located in different gaming establishments.

7. The gaming system of claim 1, wherein said controller allocates said portions of said wager inputs only to selected ones of said plurality of winning outcomes.

8. The gaming system of claim 7, wherein unselected ones of said plurality of winning outcomes receive a portion of wager inputs inputted at only the local one of said plurality of gaming terminals.

9. The gaming system of claim 1, wherein said plurality of gaming terminals further receive player-identification information that is transmitted to said controller, said controller allowing said basic wagering game to be conducted by a player in response to said player-identification information meeting certain criteria.

10. The gaming system of claim 1, wherein other winning outcomes not in said majority of said winning outcomes are associated with payment amounts funded by a local gaming machine.

11. The gaming machine of claim 10, wherein local wager inputs from said local gaming machine are allocated among said other winning outcomes, and said corresponding payout amounts within said displayed pay table on said local gaming machine are updated.

12. A method of conducting a basic wagering game, comprising:

conducting a plurality of sessions of said basic wagering game at a plurality of gaming terminals including receiving a wager input for each of said plurality of gaming sessions, said basic wagering game having a plurality of winning outcomes and a payout amount corresponding to each of said plurality of winning outcomes, said winning outcomes being determined by various symbol combinations, each of said plurality of gaming terminals including a display that displays a pay table that includes each of said plurality of winning outcomes and said corresponding payout amount; and apportioning, using a controller, said wager inputs from said plurality of sessions among said payout amounts for a majority of said winning outcomes of said basic wagering game being conducted at said plurality of gaming terminals so as to increase said payout amounts, said majority of said payout amounts each providing a different corresponding progressive award, said progressive awards being continuously displayed in said pay table as said progressive awards are being increased.

13. The method of claim 12, further including receiving player-identification information, said conducting and apportioning only occurring in response to said player-identification information meeting certain criteria.

14. The method of claim 12, wherein said some of said plurality of sessions occur sequentially at one of said plurality of gaming terminals.

15. The method of claim 12, wherein said apportioning is accomplished by a controller located remotely from said plurality of gaming terminals.

16. The method of claim 12, wherein said plurality of gaming terminals are located within a gaming establishment, said apportioning is accomplished by a controller located within said gaming establishment.

17. The method of claim 12, wherein said progressive awards are continuously displayed as said progressive awards are being increased on a real-time basis.

18. The method of claim 12, wherein said progressive awards are continuously displayed as said progressive awards are being increased at each of said plurality of gaming terminals after one of said sessions.

19. The method of claim 12, wherein said apportioning of said wager inputs is for only selected ones of said plurality of winning outcomes.

20. The method of claim 18, wherein unselected ones of said plurality of winning outcomes receive a portion of wager inputs inputted at only the local one of said plurality of gaming terminals.

21. The method of claim 12, wherein other winning outcomes not in said majority of said winning outcomes are associated with displayed payment amounts funded locally by a local gaming machine.

22. The method of claim 21, wherein said apportioning includes apportioning local wager inputs from said local gaming machine among said other winning outcomes so as to increase said displayed payout amounts on said local gaming machine.

* * * * *